United States Patent
Wu

(10) Patent No.: US 12,256,402 B2
(45) Date of Patent: Mar. 18, 2025

(54) HARQ DATA RECEPTION METHOD AND DEVICE

(71) Applicant: VIVO MOBILE COMMUNICATION CO., LTD., Guangdong (CN)

(72) Inventor: Yumin Wu, Guangdong (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 338 days.

(21) Appl. No.: 17/563,110

(22) Filed: Dec. 28, 2021

(65) Prior Publication Data

US 2022/0124790 A1   Apr. 21, 2022

Related U.S. Application Data

(63) Continuation of application No. PCT/CN2020/100004, filed on Jul. 2, 2020.

(30) Foreign Application Priority Data

Jul. 5, 2019 (CN) .......................... 201910606024.4

(51) Int. Cl.
*H04W 4/00* (2018.01)
*H04L 1/08* (2006.01)
(Continued)

(52) U.S. Cl.
CPC ............... *H04W 72/23* (2023.01); *H04L 1/08* (2013.01); *H04L 1/1812* (2013.01); *H04W 72/0446* (2013.01); *H04W 72/1268* (2013.01)

(58) Field of Classification Search
CPC ............. H04W 72/23; H04W 72/0446; H04W 72/0168; H04L 1/08; H04L 1/1812
See application file for complete search history.

(56) References Cited

U.S. PATENT DOCUMENTS 11,101,921 B2 * 8/2021 Li ........................... H04B 1/50
11,116,012 B2 * 9/2021 Li ..................... H04W 74/0833
(Continued)

FOREIGN PATENT DOCUMENTS

CN   108173632 A   6/2018
CN   108207032 A   6/2018
(Continued)

OTHER PUBLICATIONS

First Office Action for Chinese Application No. 201910606024.4, dated Mar. 17, 2021, 10 Pages.
(Continued)

*Primary Examiner* — Abdelnabi O Musa
(74) *Attorney, Agent, or Firm* — BROOKS KUSHMAN P.C.

(57) ABSTRACT

A method for data transmission, a data reception method, and a device are provided. The method includes: in a case that a first data packet has been generated based on a first uplink grant and uplink transmission corresponding to the first uplink grant is given up, determining, according to a selection rule, a second uplink grant for transmitting the first data packet. In the method of the embodiments of this disclosure, the terminal device can autonomously select an uplink grant for transmitting a data packet corresponding to a discarded uplink grant, thereby avoiding data loss.

14 Claims, 4 Drawing Sheets

In a case that a first data packet has been generated based on a first uplink grant and uplink transmission corresponding to the first uplink grant is given up, determine, according to a selection rule, a second uplink grant for transmitting the first data packet ~S110

(51) Int. Cl.
  *H04L 1/1812* (2023.01)
  *H04W 72/0446* (2023.01)
  *H04W 72/1268* (2023.01)
  *H04W 72/23* (2023.01)

(56) References Cited

U.S. PATENT DOCUMENTS

| | | | | |
|---|---|---|---|---|
| 12,127,214 | B2* | 10/2024 | Zhao | H04W 72/23 |
| 2013/0010712 | A1 | 1/2013 | Kim et al. | |
| 2014/0177584 | A1* | 6/2014 | Ouchi | H04W 52/18 |
| | | | | 370/329 |
| 2017/0265176 | A1* | 9/2017 | Marinier | H04W 72/044 |
| 2018/0176937 | A1 | 6/2018 | Chen et al. | |
| 2018/0368160 | A1 | 12/2018 | Kunt et al. | |
| 2019/0166519 | A1 | 5/2019 | Kunt et al. | |
| 2019/0174519 | A1 | 6/2019 | Lee et al. | |
| 2019/0190661 | A1* | 6/2019 | You | H04W 74/0833 |
| 2019/0380042 | A1 | 12/2019 | Niu et al. | |
| 2020/0037344 | A1* | 1/2020 | Zhao | H04W 72/1268 |
| 2020/0169987 | A1 | 5/2020 | Chen et al. | |
| 2020/0259601 | A1* | 8/2020 | Zhou | H04L 5/0085 |
| 2020/0260391 | A1* | 8/2020 | Zhou | H04L 1/189 |
| 2020/0295884 | A1* | 9/2020 | Bergström | H04L 1/189 |
| 2021/0029730 | A1* | 1/2021 | Lou | H04L 1/0027 |
| 2021/0352744 | A1* | 11/2021 | Ma | H04W 74/004 |
| 2021/0376985 | A1* | 12/2021 | Zhou | H04W 72/1268 |
| 2021/0410166 | A1* | 12/2021 | Shrestha | H04W 72/1268 |
| 2022/0046698 | A1* | 2/2022 | Zhao | H04W 72/23 |
| 2022/0124790 | A1* | 4/2022 | Wu | H04W 72/0446 |
| 2022/0256581 | A1* | 8/2022 | Wu | H04L 1/0026 |

FOREIGN PATENT DOCUMENTS

| | | |
|---|---|---|
| CN | 108617001 A | 10/2018 |
| CN | 109088704 A | 12/2018 |
| CN | 109392097 A | 2/2019 |

OTHER PUBLICATIONS

International Search Report and Written Opinion for Application No. PCT/CN2020/100004, dated Sep. 28, 2020, 7 Pages.

Interdigital, "Resource Conflicts for Data-only Intra-UE Prioritization," 3GPP RAN WG2 Meeting #106, May 13-17, 2019, R2-1906407, Item 11.7.3, Reno, NV, USA, 4 Pages.

Huawei, et al., "Handling on Simultaneous Scheduled Grant and Configured AUL Grant," 3GPP TSG-RAN2 Meeting #101bis, Apr. 16-20, 2018, R1-1805811, Item 9.12.2, Sanya, China, 2 Pages.

ZTE, et al., "Consideration on Intra-UE Multiplexing Including Re-transmission," 3GPP TSG-RAN WG2 Meeting#106, May 13-17, 2019, R2-1906121, Item 11.7.3, Reno, NV, USA, 4 Pages.

Intel Corporation, "Further Consideration on Configured UL Grant Enhancement," 3GPP TSG-RAN WG2 106, May 13-17, 2019, R2-1906274, Item 11.2.1.2, Reno, NV, USA, 5 Pages.

Foreign Office Action First Office Action for Japanese Application No. 2021-577144, dated Jan. 11, 2023, 6 Pages.

3GPP TSG RAN WG1 #97, "Discussion on UL inter UE Tx prioritization/multiplexing", Reno, USA, R1-1906520 May 13, 2019, 6 pages.

3GPP TSG-RAN WG2 #105, "On support of Intra-UE UL Mixed Services" Athens, Greece, R2-1901300, Feb. 25, 2019, 6 pages.

3GPP TSG-RAN WG2 Meeting #106, "Leftover issues for CG/CG and CG/DG prioritization" Reno, USA, R2-1905748, May 13, 2019, 4 pages.

3GPP TSG-RAN WG2 Meeting #106, "Other issue on intra-UE prioritization in IIoT" Reno, USA, R2-1906049, May 13, 2019, 4 pages.

Extended European Search Report for European Application No. 20836051.1-1215, dated Jul. 7, 2022, 13 Pages.

Interdigital, "Summary of [104#35][NR/IIOT] Intra UE Prioritization UL Data Data (Interdigital)," 3GPP TSG-RAN WG2 #105, Agenda item 11.7.3, Feb. 25-Mar. 1, 2019, R2-1901458, Athens, Greece, 28 Pages.

Nokia, et al., "Handling of De-prioritized Uplink Transmission," 3GPP TSG-RAN WG2 #106, Agenda item 11.7.3, May 13-17, 2019, R2-1906188, Reno, NV, USA, 2 Pages.

Huawei, et al., "Further Discussion on Transmission of De-prioritized Data Due to Intra-UE Prioritization," 3GPP TSG-RAN WG2 #106, Agenda item 11.7.3, May 13-17, 2019, R2-1906507 (Revision of R2-1903370), Reno, NV, USA, 3 Pages.

Ericsson, "Main Functions of Intra-UE Data-data Prioritization," 3GPP TSG-RAN WG2 #106, Agenda item 11.7.3, May 13-17, 2019, Tdoc R2-1906848 (Revision of R2-1904055), Reno, NV, USA, 2 Pages.

First Office Action for Singapore Application No. 11202114558Y, dated Feb. 29, 2024, 10 Pages.

\* cited by examiner

In a case that a first data packet has been generated based on a first uplink grant and uplink transmission corresponding to the first uplink grant is given up, determine, according to a selection rule, a second uplink grant for transmitting the first data packet  ~S110
FIG. 1
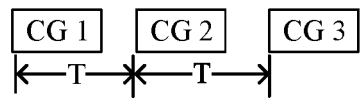
FIG. 2
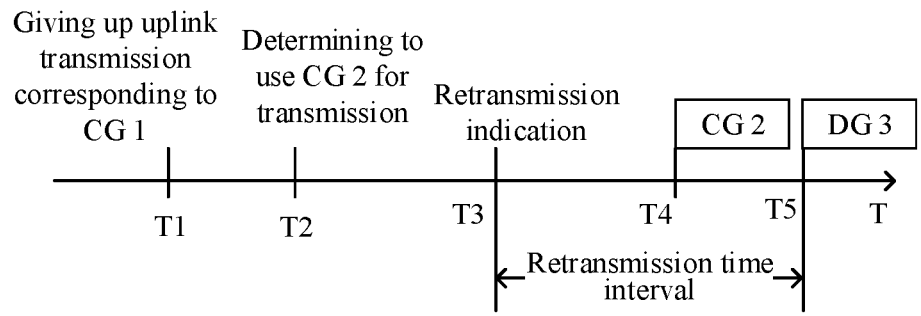
FIG. 3

If retransmission indication information has not been transmitted to a terminal device before a first data packet is received by using a second uplink grant, receive the first data packet by using the second uplink grant, where the retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant ~S210

FIG. 4

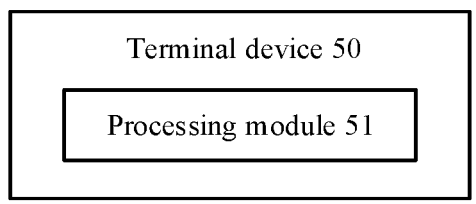

FIG. 5

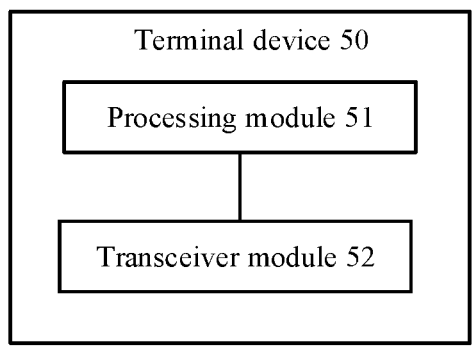

FIG. 6

HARQ DATA RECEPTION METHOD AND DEVICE

CROSS-REFERENCE TO RELATED APPLICATIONS

This application is a continuation application of International Application No. PCT/CN2020/100004 filed on Jul. 2, 2020, which claims priority to Chinese Patent Application No. 201910606024.4, filed with the China National Intellectual Property Administration on Jul. 5, 2019 and entitled "METHOD FOR DATA TRANSMISSION, METHOD FOR DATA RECEPTION, AND DEVICE", which is incorporated herein by reference in its entirety.

TECHNICAL FIELD

This disclosure relates to the field of communications technologies, and more specifically, to a method for data transmission, a method for data reception, and a device.

BACKGROUND

To transmit at least two independent uplink channels simultaneously, a terminal device needs to determine whether an uplink power of the terminal device is limited and whether the terminal device has a capability of transmitting uplink channels simultaneously. If the terminal device is incapable of transmitting a plurality of uplink channels simultaneously, the terminal device may transmit the uplink channels in a priority order for transmitting uplink channels of a physical layer specified in a protocol.

Further, for a plurality of uplink grants conflicting in uplink transmission, a medium access control (MAC) layer of the terminal device selects a higher-priority uplink grant for transmission based on priorities of the plurality of uplink grants. Herein, a priority of uplink grant is determined by highest-priority data (for example, a highest-priority logical channel) in a plurality of pieces of data to be transmitted by using the uplink grant.

In this case, the terminal device possibly discards some uplink grants. However, the terminal device has generated MAC protocol data units (PDU) for the discarded uplink grants. Therefore, how to transmit data in these MAC PDUs and avoid data loss is a problem that needs to be resolved.

SUMMARY

Embodiments of this disclosure are intended to provide a method for data transmission, a method for data reception, and a device.

The embodiments of this disclosure are implemented as follows:

According to a first aspect, a method for data transmission is provided and applied to a terminal device, and the method includes:

in a case that a first data packet has been generated based on a first uplink grant and uplink transmission corresponding to the first uplink grant is given up, determining, according to a selection rule, a second uplink grant for transmitting the first data packet.

According to a second aspect, a method for data transmission is provided and applied to a network device, and the method includes:

if retransmission indication information has not been transmitted to a terminal device before a first data packet is received by using a second uplink grant, receiving the first data packet by using the second uplink grant; where the retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant.

According to a third aspect, a terminal device is provided, including:

a processing module, configured to: in a case that a first data packet has been generated based on a first uplink grant and uplink transmission corresponding to the first uplink grant is given up, determine, according to a selection rule, a second uplink grant for transmitting the first data packet.

According to a fourth aspect, a network device is provided, including:

a processing module, configured to: if retransmission indication information has not been transmitted to a terminal device before a first data packet is received by using a second uplink grant, receive the first data packet by using the second uplink grant; where the retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant.

According to a fifth aspect, a terminal device is provided, including a processor, a memory, and a computer program stored in the memory and capable of running on the processor, where when the computer program is executed by the processor, the steps of the method according to the first aspect are implemented.

According to a sixth aspect, a network device is provided, including a processor, a memory, and a computer program stored in the memory and capable of running on the processor, where when the computer program is executed by the processor, the steps of the method according to the second aspect are implemented.

According to a seventh aspect, a computer-readable storage medium is provided, where a computer program is stored in the computer-readable storage medium, and when the computer program is executed by a processor, the steps of the method according to the first aspect are implemented.

According to an eighth aspect, a computer-readable storage medium is provided, where a computer program is stored in the computer-readable storage medium, and when the computer program is executed by a processor, the steps of the method according to the second aspect are implemented.

BRIEF DESCRIPTION OF DRAWINGS

The accompanying drawings described herein are intended for better understanding of this disclosure, and constitute a part of this disclosure. Exemplary embodiments and descriptions thereof in this disclosure are intended to interpret this disclosure and do not constitute any improper limitation on this disclosure. In the accompanying drawings:

FIG. 1 is a schematic flowchart of a method for data transmission according to an embodiment of this disclosure;

FIG. 2 is a schematic diagram of a method for data transmission according to a specific embodiment of this disclosure;

FIG. 3 is a schematic diagram of a method for data transmission according to another specific embodiment of this disclosure;

FIG. 4 is a schematic flowchart of a method for data reception according to an embodiment of this disclosure;

FIG. 5 is a schematic structural diagram of a terminal device according to an embodiment of this disclosure;

FIG. 6 is another schematic structural diagram of a terminal device according to an embodiment of this disclosure;

DETAILED DESCRIPTION OF EMBODIMENTS

Figure 7:
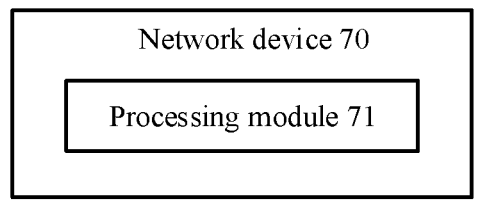
FIG. 7 is a schematic structural diagram of a network device according to an embodiment of this disclosure.

The following clearly describes the technical solutions in the embodiments of this disclosure with reference to the accompanying drawings in the embodiments of this disclosure. Apparently, the described embodiments are sonic but not all of the embodiments of this disclosure. All other embodiments obtained by a person of ordinary skill in the art based on the embodiments of this disclosure without creative efforts shall fall within the protection scope of this disclosure.

The technical solutions of this disclosure may be applied to various communications systems, such as a Global System for Mobile communications (GSM), a Code Division Multiple Access (CDMA) system, a Wideband Code Division Multiple Access (WCDMA) system, a General Packet Radio Service (GPRS) system, a Long Term Evolution (LTE)/Long Term Evolution advanced (LTE-A) system, a New Radio (NR) system, and a later evolved communications system.

In the embodiments of this disclosure, the terminal device (UE) is also referred to as a mobile terminal, mobile user equipment, and the like, and may communicate with one or more core networks through a radio access network (for example, RAN). The user equipment may be a mobile terminal, such as a mobile phone (or referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

In the embodiments of this disclosure, a network device is an apparatus deployed in a radio access network to provide radio communication functions for terminal devices. For example, the network device may be a base station, and the base station may be an evolved base station (eNB or e-NodeB, evolved Node B) in LTE and a 5G base station (gNB), or a network-side device of a later evolved version. This is not limited in this disclosure.

The technical solutions provided in the embodiments of this disclosure are described in detail below with reference to the accompanying drawings.

FIG. 1 illustrates a method for data transmission according to an embodiment of this disclosure. The method shown in FIG. 1 is executed by a terminal device. As shown in FIG. 1, the method includes the following steps.

S110: In a case that a first data packet has been generated based on a first uplink grant and uplink transmission corresponding to the first uplink grant is given up, determine, according to a selection rule, a second uplink grant for transmitting the first data packet.

It should be noted that in this embodiment of this disclosure, a cause for giving up the uplink transmission corresponding to the first uplink grant by the terminal device is not limited in this embodiment of this disclosure. For example, in a case that the first uplink grant conflicts with another uplink grant, the terminal device may give up the uplink transmission corresponding to the first uplink grant. Alternatively, in a case that an uplink power is limited, the terminal device may give up the uplink transmission corresponding to the first uplink grant.

In S110, the first uplink grant and the second uplink grant correspond to a same hybrid automatic repeat request (HARQ) process index; or the first uplink grant and the second uplink grant correspond to different HARQ process indexes.

Optionally, in some embodiments, the selection rule includes one of the following rules: an uplink grant conflicting with the first uplink grant is determined as the second uplink grant; and determining a target uplink grant located after the first uplink grant in time domain as the second uplink grant.

With reference to specific examples, the following describes in detail the selection rule and a method for determining the second uplink grant by the terminal device according to the selection rule.

Example a

The selection rule includes: determining the uplink grant conflicting with the first uplink grant as the second uplink grant. For example, the terminal device generates a MAC PDU 1 based on an uplink grant 1, and places the MAC PDU 1 into a buffer of a HARQ process 1 to wait for transmission. However, due to conflict between the uplink grant 1 and an uplink grant 2, the terminal device gives up uplink transmission corresponding to the uplink grant 1. In this case, the terminal device reconstructs the MAC PDU 1 into a MAC PDU 2 based on the uplink grant 2, and transmits the MAC PDU 2 by using the uplink grant 2. The uplink grant 1 herein may be a configured uplink grant (CG), and the uplink grant 2 may be a dynamic uplink grant (DG).

Example b

The selection rule includes: determining the target uplink grant located after the first uplink grant in time domain as the second uplink grant. A type of the first uplink grant is a configured uplink grant, the target uplink grant corresponds to first configuration information for configuring the first uplink grant, and a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device.

It should be noted that the time point of determining use of the target uplink grant can be understood as: a time point of giving up the uplink transmission corresponding to the first uplink grant; or the time point of determining use of the target uplink grant can be understood as: a time point at which the terminal device determines, after the uplink transmission corresponding to the first uplink grant is given up, to use the target uplink grant for transmitting the first data packet.

In a specific example, as shown in FIG. 2, the terminal device gives up uplink transmission corresponding to a CG 1, but has generated a MAC PDU 1 based on the CG 1. Configuration information for configuring the CG 1 is cgConfig-1, and CGs corresponding to cgConfig-1 includes a CG 2 and a CG 3. However, a time interval between the CG 2 and the CG 1 is excessively short, and the terminal device cannot reconstruct the MAC PDU 1 into a MAC PDU 2 based on the CG 2 (for example, a minimum time required for reconstructing a MAC PDU by the terminal device is 5 ms, but the time interval between the CG 2 and the CG 1 is 3 ms). The CG 3 meets a minimum time required for reconstructing the MAC PDU 1 by the terminal device (for example, a time interval between the CG 3 and the CG 1 is 6 ms), and therefore the terminal device reconstructs the MAC PDU 1 into a MAC PDU 3 based on the CG 3 for transmission.

In the foregoing specific example, the CG 1 and the CG 2 may have a same HARQ process index, or the CG 1 and the CG 2 may have different HARQ process indexes. The CG 1 and the CG 3 may have a same HARQ process index, or the CG 1 and the CG 3 may have different HARQ process indexes.

Example c

The selection rule includes: determining the target uplink grant located after the first uplink grant in time domain as the second uplink grant. A type of the first uplink grant is a configured uplink grant, the target uplink grant corresponds to first configuration information for configuring the first uplink grant, and a time interval between the target uplink grant and the first uplink grant is less than a time interval between the first uplink grant and another uplink grant in uplink grants corresponding to the first configuration information.

In other words, the type of the first uplink grant is a configured uplink grant, configuration information for configuring the first uplink grant is the first configuration information, and the terminal device determines an uplink grant next to the first uplink grant in time domain in uplink grants corresponding to the first configuration information as the second uplink grant.

In a specific example, uplink transmission corresponding to a CG 1 for the terminal device is given up, but the terminal device has generated a MAC PDU 1 based on the CG 1. Configuration information for configuring the CG 1 is cgConfig-1, and an uplink grant next to the CG 1 in CGs corresponding to cgConfig-1 is the CG 2 (the CG 1 and the CG 2 may have a same HARQ process index, or the CG 1 and the CG 2 may have different HARQ process indexes). In this case, the terminal device reconstructs the MAC PDU 1 into a MAC PDU 2 based on the CG 2 and transmits the MAC PDU 2 by using the CG 2, or the terminal device transmits the MAC PDU 1 by using the CG 2.

Example d

The selection rule includes: determining the target uplink grant located after the first uplink grant in time domain as the second uplink grant. A type of the first uplink grant is a configured uplink grant, the target uplink grant is a configured uplink grant, the target uplink grant corresponds to second configuration information, and a time interval between the target uplink grant and the first uplink grant is less than a time interval between the first uplink grant and another uplink grant in uplink grants corresponding to the second configuration information; where the second configuration information includes at least one uplink grant configuration information.

In other words, the type of the first uplink grant is a configured uplink grant, configuration information for configuring the first uplink grant is the first configuration information, and the terminal device determines an uplink grant next to the first uplink grant in time domain in uplink grants corresponding to the second configuration information as the second uplink grant.

In a specific example, uplink transmission corresponding to a CG 1 for the terminal device is given up, but the terminal device has generated a MAC PDU 1 based on the CG 1. Configuration information for configuring the CG 1 is cgConfig-1, and a CG next to the CG 1 is a CG 2, and configuration information for configuring the CG 2 is cgConfig-2 (that is, a CG configured for retransmission may be different from the CG 1). The terminal device reconstructs the MAC PDU 1 into a MAC PDU 2 based on the CG 2 for transmission, or the terminal device transmits the MAC PDU 1 by using the CG 2.

In another specific example, the network device may configure a plurality of pieces of uplink grant configuration information for the terminal device. For example, a network device configures two pieces of uplink grant configuration information for the terminal device, and the two pieces of uplink grant configuration information are configuredGrantConfiguration-1 and configuredGrantConfiguration-2. In this case, both the two pieces of uplink grant configuration information belong to the second configuration information.

Example e

The selection rule includes: determining the target uplink grant located after the first uplink grant in time domain as the second uplink grant. A type of the first uplink grant is a configured uplink grant, the target uplink grant is a configured uplink grant, the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device.

The second configuration information includes at least one piece of uplink grant configuration information.

It should be noted that the time point of determining use of the target uplink grant can be understood as: a time point of giving up the uplink transmission corresponding to the first uplink grant; or the time point of determining use of the target uplink grant can be understood as: a time point at which the terminal device determines, after the uplink transmission corresponding to the first uplink grant is given up, to use the target uplink grant for transmitting the first data packet.

In a specific example, uplink transmission corresponding to a CG 1 for the terminal device is given up, but the terminal device has generated a MAC PDU 1 based on the CG 1. Configuration information for configuring the CG 1 is cgConfig-1, and a CG next to the CG 1 is a CG 2, and configuration information for configuring the CG 2 is cgConfig-2 (that is, a CG configured for retransmission may be different from the CG 1). However, a time interval between the CG 2 and the CG 1 is excessively short, and the terminal device cannot reconstruct the MAC PDU 1 into a MAC PDU 2 based on the CG 2 (for example, a minimum time required for reconstructing a MAC PDU by the terminal device is 5 ms, but the time interval between the CG 2 and the CG 1 is 3 ms). A CG next to the CG 1 is the CG 3, configuration information for configuring the CG 3 is cgConfig-3, and a time interval between the CG 3 and the CG 1 meets a minimum time required for reconstructing the MAC PDU 1 by the terminal device (for example, the time interval between the CG 3 and the CG 1 is 6 ms), and therefore the terminal device reconstructs the MAC PDU 1 into a MAC PDU 3 based on the CG 3 for transmission.

Example f

The selection rule includes: determining the target uplink grant located after the first uplink grant in time domain as the second uplink grant. The target uplink grant is an uplink grant with a smallest time interval from the first uplink grant in all uplink grants of the terminal device.

In other words, if uplink transmission corresponding to the first uplink grant is given up and the terminal device has generated the first data packet based on the first uplink grant, the terminal device determines an uplink grant next to the first uplink grant as the second uplink grant.

It can be understood that the first uplink grant may be a configured uplink grant or a dynamic uplink grant. The second configured grant may be a configured uplink grant or a dynamic uplink grant.

In an example, in the foregoing example d to example f, a transport block size (TBS) for the second uplink grant is greater than or equal to a TBS for the first uplink grant.

Further, on the basis of all the foregoing examples, the method shown in FIG. 1 further includes:

after the second data packet is generated based on the second uplink grant, clearing the first data packet, or continuing to store the first data packet, where the second data packet includes data of the first data packet.

For example, the terminal device gives up the uplink transmission corresponding to the uplink grant 1, but has generated the MAC PDU 1 based on the uplink grant 1. In this case, after the terminal device reconstructs the MAC PDU 1 into the MAC PDU 2 based on the uplink grant 2, the terminal device may perform on of the following operations on the MAC PDU 1:

Operation 1: Clear the MAC PDU 1. For example, the MAC PDU 1 generated by the terminal device is stored in a HARQ process 1. After the terminal device reconstructs the MAC PDU 1 into the MAC PDU 2 based on the uplink grant 2, the MAC PDU 2 may be stored in a HARQ process 2, and the terminal device may clear the MAC PDU 1 buffered in the HARQ process 1.

Operation 2: Continue to store the MAC PDU 1. For example, the MAC PDU 1 generated by the terminal device is stored in a HARQ process 1. After the terminal device reconstructs the MAC PDU 1 into the MAC PDU 2 based on the uplink grant 2, the MAC PDU 2 may be stored in a HARQ process 2, and the terminal device may continue to store the MAC PDU 1 buffered in the HARQ process 1.

Further, on the basis of all the foregoing embodiments, the method shown in FIG. 1 further includes:

if the retransmission indication information has not been received before the first data packet is transmitted by using the second uplink grant, transmitting the first data packet by using the second uplink grant, where the retransmission indication information indicates that the terminal device transmits the first data packet by using a third uplink grant.

It can be understood that the terminal device transmitting the first data packet by using the second uplink grant may be directly transmitting the first data packet or may be transmitting a data packet reconstructed from the first data packet.

Alternatively, if the retransmission indication information has been received before the first data packet is transmitted by using the second uplink grant, the first data packet is transmitted in a target manner, where the target manner includes one of the following manners:

giving up transmitting the first data packet by using the second uplink grant, and transmitting the first data packet by using the third uplink grant;

giving up transmitting the first data packet by using the third uplink grant, and transmitting the first data packet by using the second uplink grant;

transmitting the first data packet by using one uplink grant, with a smaller time interval from the first uplink grant, in the second uplink grant and the third uplink grant;

transmitting the first data packet by using one uplink grant with higher transmission reliability in the second uplink grant and the third uplink grant;

transmitting the first data packet by using one uplink grant with a larger TBS in the second uplink grant and the third uplink grant;

transmitting the first data packet by using one uplink grant, occupying fewer transmission resources, in the second uplink grant and the third uplink grant; and transmitting the first data packet by using the second uplink grant and the third uplink grant.

In other words, after the terminal device autonomously determines to use a subsequent uplink grant for transmitting the first data packet, and before the first data packet is transmitted, if a retransmission indication for the first data packet specified by the network device has been received, the terminal device transmits the first data packet in the target manner.

In an example, as shown in FIG. 3, the terminal device gives up uplink transmission corresponding to a CG 1 at a time point T1; however, a MAC PDU 1 has been generated based on the CG 1. The terminal device determines at a time point T2 to use a CG 2 for transmitting the MAC PDU 1, and a transmit time point for the CG 2 is T4, The terminal device receives a retransmission indication at a time point T3, where the retransmission indication indicates retransmitting the MAC PDU 1, and an uplink grant corresponding to the retransmission is a DG 3. In this case, the terminal device may transmit the MAC PDU 1 in one of the following manners:

Manner 1: The terminal device gives up transmitting the MAC PDU 1 by using the CG 2 and transmits the MAC PDU 1 by using the DG 3.

Manner 2: The terminal device gives up transmitting the MAC PDU 1 by using the DG 3 and transmits the MAC PDU 1 by using the CG 2. Alternatively, it can be understood that the terminal device gives up retransmission indicated by the network side, and transmits the MAC PDU 1 by using an uplink grant determined by the terminal device.

Manner 3: The terminal device selects one nearest to the CG 1 from the CG 2 and the DG 3 to transmit the MAC PDU 1. For example, as shown in FIG. 3, the terminal device transmits the MAC PDU 1 by using the CG 2.

Manner 4: The terminal device selects one with higher transmission reliability from the CG 2 and the DG 3 to transmit the MAC PDU 1. For example, if transmission reliability of the CG 2 is higher than transmission reliability of the DG 3, the MAC PDU 1 is transmitted by using the CG 2 and uplink transmission corresponding to DG 3 is then given up.

Manner 5: The terminal device selects one with a larger TBS from the CG 2 and the DG 3 to transmit the MAC PDU 1, For example, if a TBS of the CG 2 is greater than a TBS of the DG 3, the MAC PDU 1 is transmitted by using the CG 2 and uplink transmission corresponding to DG 3 is then given up.

Manner 6: The terminal device selects one occupying fewer transmission resources from the CG 2 and the DG 3 to transmit the MAC PDU 1. For example, if physical resource blocks occupied by the CG 2 are less than physical resource blocks occupied by the DG 3, the MAC PDU 1 is transmitted by using the CG 2 and uplink transmission corresponding to DG 3 is then given up.

Manner 7: The terminal device transmits the MAC PDU 1 by using the CG 2 and the DG 3. That is, the terminal device transmits the MAC PDU 1 by using the CG 2 and also transmits the MAC PDU 1 by using the DG 3. In other words, the terminal device transmits the MAC PDU 1 based on a retransmission opportunity indicated by the network side, and also transmits the MAC PDU 1 by using the uplink grant determined by the terminal device.

The foregoing describes in detail the method for data transmission according to an embodiment of this disclosure from the terminal device side with reference to FIG. 1 to FIG. 3. The following describes in detail a method for data reception according to an embodiment of this disclosure from a network device side with reference to FIG. 4. It should be noted that descriptions of interaction between the terminal device and the network device described from the network device side are the same as those from the terminal device side. To avoid repetition, related descriptions are appropriately omitted.

FIG. 4 is a schematic flowchart of a method for data reception according to an embodiment of this disclosure. The method shown in FIG. 4 is executed by a network device. As shown in FIG. 4, the method includes the following steps.

S210: If retransmission indication information has not been transmitted to a terminal device before a first data packet is received by using a second uplink grant, receive the first data packet by using the second uplink grant, where the retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant.

Optionally, in an embodiment, the selection rule includes one of the following rules:
  determining an uplink grant conflicting with the first uplink grant as the second uplink grant; and
  determining a target uplink grant located after the first uplink grant in time domain as the second uplink grant.

Optionally, in an embodiment, a type of the first uplink grant is a configured uplink grant, the target uplink grant corresponds to first configuration information for configuring the first uplink grant, and a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device.

Optionally, in an embodiment, a type of the first uplink grant is a configured uplink grant, the target uplink grant corresponds to first configuration information for configuring the first uplink grant, and a time interval between the target uplink grant and the first uplink grant is less than a time interval between the first uplink grant and another uplink grant in uplink grants corresponding to the first configuration information.

Optionally, in an embodiment, a type of the first uplink grant is a configured uplink grant, the target uplink grant is a configured uplink grant, the target uplink grant corresponds to second configuration information, and a time interval between the target uplink grant and the first uplink grant is less than a time interval between the first uplink grant and another uplink grant in uplink grants corresponding to the second configuration information.

The second configuration information includes at least one piece of uplink grant configuration information.

Optionally, in an embodiment, a type of the first uplink grant is a configured uplink grant, the target uplink grant is a configured uplink grant, the target uplink grant corresponds to second configuration information, a time interval between the target uplink grant and the first uplink grant or a film, point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device.

The second configuration information includes at least one piece of uplink grant configuration information.

Optionally, in an embodiment, the target uplink grant is an uplink grant with a smallest time interval from the first uplink grant in all uplink grants of the terminal device.

Optionally, in an embodiment, the first uplink grant and the second uplink grant correspond to a same hybrid automatic repeat request HARQ process index; or
  the first uplink grant and the second uplink grant correspond to different HARQ process indexes, Optionally, in an embodiment, a transport block size (TBS) for the second uplink grant is greater than or equal to a TBS for the first uplink grant.

Optionally, in another embodiment, the method shown in FIG. 4 further includes:
  if the retransmission indication information has been transmitted to the terminal device before the first data packet is received by using the second uplink grant, receiving the first data packet in a target manner.
The target manner includes one of the following manners:
  giving up receiving the first data packet by using the second uplink grant, and receiving the first data packet by using the third uplink grant;
  giving up receiving the first data packet by using the third uplink grant, and receiving the first data packet by using the second uplink grant;

receiving the first data packet by using one uplink grant, with a smaller tune interval from the first uplink grant, in the second uplink grant and the third uplink grant;

receiving the first data packet by using one uplink grant with higher transmission reliability in the second uplink grant and the third uplink grant;

receiving the first data packet by using one uplink grant with a larger TBS in the second uplink grant and the third uplink grant;

receiving the first data packet by using one uplink grant, occupying fewer transmission resources, in the second uplink grant and the third uplink grant; and receiving the first data packet by using the second uplink grant and the third uplink grant.

The foregoing describes in detail the method for data transmission and the method for data reception according to the embodiments of this disclosure with reference to FIG. 1 to FIG. 4, and the following describes in detail a terminal device according to an embodiment of this disclosure with reference to FIG. 5.

FIG. 5 is a schematic structural diagram of a terminal device according to an embodiment of this disclosure. As shown in FIG. 5, the terminal device 50 includes:

a processing module 51, configured to: in a case that a first data packet has been generated based on a first uplink grant and uplink transmission corresponding to the first uplink grant is given up, determine, according to a selection rule, a second uplink grant for transmitting the first data packet.

Optionally, in an embodiment, the selection rule includes one of the following rules:

determining an uplink grant conflicting with the first uplink grant as the second uplink grant; and determining a target uplink grant located after the first uplink grant in time domain as the second uplink grant.

Optionally, in an embodiment, a type of the first uplink grant is a configured uplink grant, the target uplink grant corresponds to first configuration information for configuring the first uplink grant, and a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device.

Optionally, in an embodiment, a type of the first uplink grant is a configured uplink grant, the target uplink grant corresponds to first configuration information for configuring the first uplink grant, and a time interval between the target uplink grant and the first uplink grant is less than a time interval between the first uplink grant and another uplink grant in uplink grants corresponding to the first configuration information.

Optionally, in an embodiment, a type of the first uplink grant is a configured uplink grant, the target uplink grant is a configured uplink grant, the target uplink grant corresponds to second configuration information, and a time interval between the target uplink grant and the first uplink grant is less than a time interval between the first uplink grant and another uplink grant in uplink grants corresponding to the second configuration information.

The second configuration information includes at least one piece of uplink grant configuration information.

Optionally, in an embodiment, a type of the first uplink grant is a configured uplink grant, the target uplink grant is a configured uplink grant, the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device.

The second configuration information includes at least one piece of uplink grant configuration information.

Optionally, in an embodiment, the target uplink grant is an uplink grant with a smallest time interval from the first uplink grant in all uplink grants of the terminal device.

Optionally, in an embodiment, the first uplink grant and the second uplink grant correspond to a same hybrid automatic repeat request HARQ process index; or the first uplink grant and the second uplink grant correspond to different HARQ process indexes.

Optionally, in an embodiment, a transport block size (TBS) for the second uplink grant is greater than or equal to a TBS for the first uplink grant.

Optionally, in an embodiment, the processing module 51 is further configured to:

after a second data packet is generated based on the second uplink grant, clear the first data packet, or continue to store the first data packet, where the second data packet includes data of the first data packet.

Optionally, in an embodiment, as shown in FIG. 6, the terminal device 50 further includes:

a transceiver module 52, configured to: if retransmission indication information has not been received before the first data packet is transmitted by using the second uplink grant, transmit the first data packet by using the second uplink grant.

The retransmission indication information indicates that the terminal device transmits the first data packet by using a third uplink grant.

Optionally, in an embodiment, as shown in FIG. 6, the terminal device 50 further includes a transceiver module 52, configured to: if the retransmission indication information has been received before the first data packet is transmitted by using the second uplink grant, transmit the first data packet in a target manner.

The target manner includes one of the following manners:

giving up transmitting the first data packet by using the second uplink grant, and transmitting the first data packet by using the third uplink grant;

giving up transmitting the first data packet by using the third uplink grant, and transmitting the first data packet by using the second uplink grant;

transmitting the first data packet by using one uplink grant, with a smaller time interval from the first uplink grant, in the second uplink grant and the third uplink grant;

transmitting the first data packet by using one uplink grant with higher transmission reliability in the second uplink grant and the third uplink grant;

transmitting the first data packet by using one uplink grant with a larger TBS in the second uplink grant and the third uplink grant;

transmitting the first data packet by using one uplink grant, occupying fewer transmission resources, in the second uplink grant and the third uplink grant; and transmitting the first data packet by using the second uplink grant and the third uplink grant.

The terminal device provided in this embodiment of this disclosure is capable of implementing the processes that are implemented by the terminal device in the method embodiments of FIG. 1 to FIG. 3. To avoid repetition, details are not described herein again.

FIG. 7 is a schematic structural diagram of a network device according to an embodiment of this disclosure. As shown in FIG. 7, the network device 70 includes:

a processing module 71, configured to: if retransmission indication information has not been transmitted to a terminal device before a first data packet is received by using a second uplink grant, receive the first data packet by using the second uplink grant.

The retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant.

Optionally, in an embodiment, the selection rule includes one of the following rules:

determining an uplink grant conflicting with the first uplink grant as the second uplink grant; and determining a target uplink grant located after the first uplink grant in time domain as the second uplink grant.

Optionally, in an embodiment, a type of the first uplink grant is a configured uplink grant, the target uplink grant corresponds to first configuration information for configuring the first uplink grant, and a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device.

Optionally, in an embodiment, a type of the first uplink grant is a configured uplink grant, the target uplink grant corresponds to first configuration information for configuring the first uplink grant, and a time interval between the target uplink grant and the first uplink grant is less than a time interval between the first uplink grant and another uplink grant in uplink grants corresponding to the first configuration information.

Optionally, in an embodiment, a type of the first uplink grant is a configured uplink grant, the target uplink grant is a configured uplink grant, the target uplink grant corresponds to second configuration information, and a time interval between the target uplink grant and the first uplink grant is less than a time interval between the first uplink grant and another uplink grant in uplink grants corresponding to the second configuration information.

The second configuration information includes at least one piece of uplink grant configuration information.

Optionally, in an embodiment, a type of the first uplink grant is a configured uplink grant, the target uplink grant is a configured uplink grant, the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device.

The second configuration information includes at least one piece of uplink grant configuration information.

Optionally, in an embodiment, the target uplink grant is an uplink grant with a smallest time interval from the first uplink grant in all uplink grants of the terminal device.

Optionally, in an embodiment, the first uplink grant and the second uplink grant correspond to a same hybrid automatic repeat request HARQ process index; or the first uplink grant and the second uplink grant correspond to different HARQ process indexes.

Optionally, in an embodiment, a transport block size (TBS) for the second uplink grant is greater than or equal to a TBS for the first uplink giant.

Figure 8:
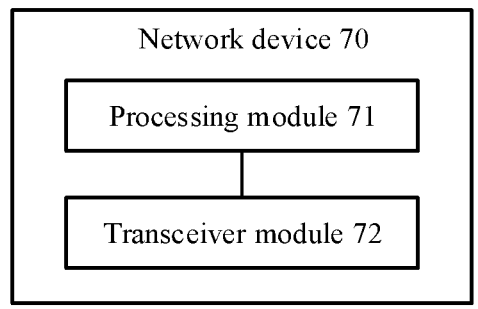
FIG. 8 is another schematic structural diagram of a network device according to an embodiment of this disclosure.

Optionally, in an embodiment, as shown in FIG. 8, the network device 70 further includes a transceiver module 72, configured to: if the retransmission indication information has been transmitted to the terminal device before the first data packet is received by using the second uplink grant, receive the first data packet in a target manner.

The target manner includes one of the following manners:

giving up receiving the first data packet by using the second uplink grant, and receiving the first data packet by using the third uplink grant;

giving up receiving the first data packet by using the third uplink grant, and receiving the first data packet by using the second uplink grant;

receiving the first data packet by using one uplink grant, with a smaller time interval from the first uplink grant, in the second uplink grant and the third uplink grant;

receiving the first data packet by using one uplink grant with higher transmission reliability in the second uplink grant and the third uplink grant;

receiving the first data packet by using one uplink grant with a larger TBS in the second uplink grant and the third uplink grant;

receiving the first data packet by using one uplink grant, occupying fewer transmission resources, in the second uplink grant and the third uplink grant; and receiving the first data packet by using the second uplink grant and the third uplink grant.

The network device provided in this embodiment of this disclosure is capable of implementing the processes thaw are implemented by the network device in the method embodiment in FIG. 4. To avoid repetition, details are not described herein again.

Figure 9:
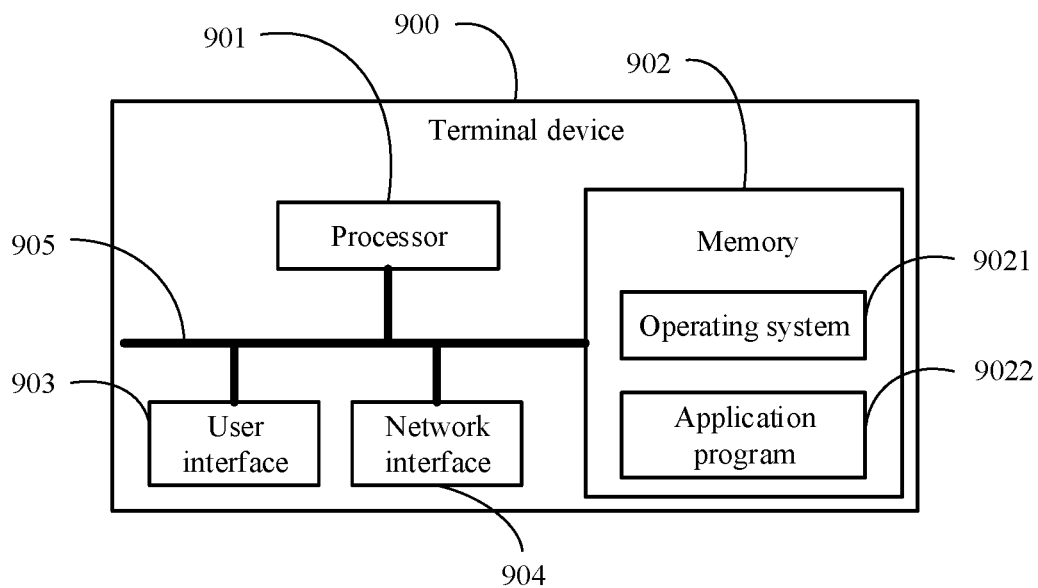
FIG. 9 is a schematic structural diagram of a terminal device according to another embodiment of this disclosure.

FIG. 9 is a block diagram of a terminal device according to another embodiment of this disclosure. The terminal device 900 shown in FIG. 9 includes at least one processor 901, a memory 902, a user interface 903, and at least one network interface 904. The components of the terminal device 900 are coupled together by using a bus system 905. It can be understood that the bus system 905 is configured to implement connection communication between these components. The bus system 905 may include not only a data bus but also a power supply bus, a control bus, and a status signal bus. However, for clarity of description, various buses are marked as the bus system 905 in FIG. 9.

The user interface 903 may include a display, a keyboard, a click device (for example, a mouse or a trackball), a touch board, or a touchscreen.

It can be understood that the memory 902 in this embodiment of this disclosure may be a volatile memory or a non-volatile memory, or may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 902 in the system and method described in the embodiments of this disclosure is intended to include but is not limited to these and any other suitable types of memories.

In some implementations, the memory 902 stores the following elements: an executable module or a data structure, or a subset thereof, or an extended set thereof: an operating system 9021 and an application program 9022.

The operating system 9021 includes various system programs, such as a framework layer, a kernel library layer, and a driver layer, and is configured to implement various basic services and process hardware-based tasks. The application program 9022 includes various application programs, such as a media player, and a browser, and is configured to implement various application services. A program that implements the methods of the embodiments of this disclosure may be included in the application program 9022.

In some embodiments of this disclosure, the terminal device 900 further includes: a computer program stored in the memory 902 and capable of running on the processor 901. When the computer program is executed by the processor 901, the processes of the foregoing method shown in FIG. 1 are implemented, with the same technical effects achieved. To avoid repetition, details are not described herein again.

The foregoing methods disclosed by the embodiments of this disclosure may be applied to the processor 901, or be implemented by the processor 901. The processor 901 may be an integrated circuit chip and has a signal processing capability. In an implementation process, steps in the foregoing method can be implemented by using a hardware integrated logical circuit in the processor 901, or by using instructions in a form of software. The processor 901 may be a general-purpose processor, a digital signal processor (DSP), an application-specific integrated circuit (ASIC), a field programmable gate array (FPGA) or another programmable logical device, a discrete gate or transistor logical device, or a discrete hardware component. The processor 901 may implement or execute the methods, steps, and logical block diagrams disclosed in the embodiments of this disclosure. The general-purpose processor may be a microprocessor or any regular processor. The steps of the methods disclosed with reference to the embodiments of this disclosure may be directly implemented by a hardware decoding processor, or may be implemented by a combination of hardware and software modules in a decoding processor.

The software module may be located in a computer readable storage medium that is mature in the art, such as a random access memory, a flash memory, a read-only memory, a programmable read-only memory, or an electrically erasable programmable memory, or a register. The computer readable storage medium is located in the memory 902, and the processor 901 reads information in the memory 902 and implements, in combination with its hardware, the steps of the foregoing methods. Specifically, a computer program is stored in the computer-readable storage medium, and when the computer program is executed by the processor 901, the steps of the method embodiments described in FIG. 1 are implemented.

It may be understood that the embodiments described in this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

Figure 10:
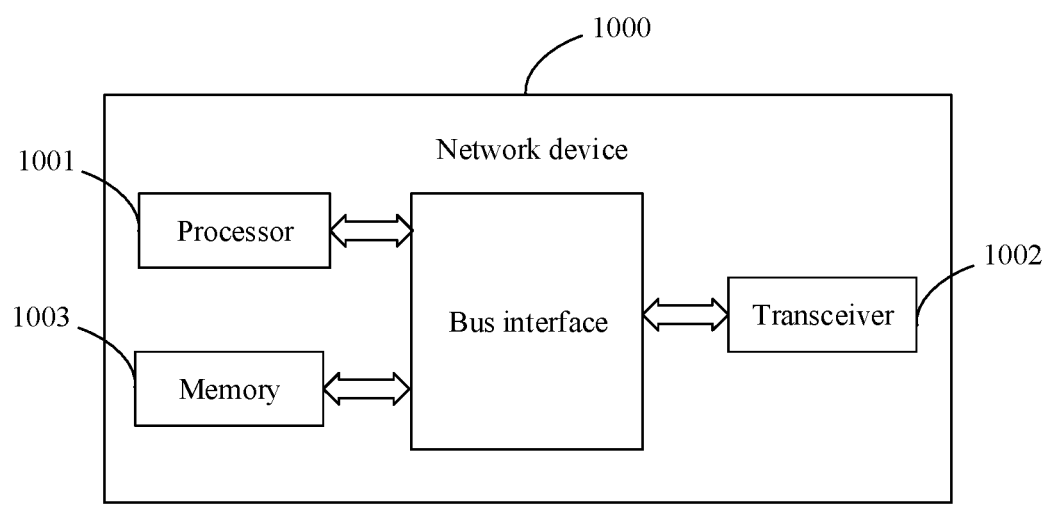
FIG. 10 is a schematic structural diagram of a network device according to another embodiment of this disclosure.

FIG. 10 is a schematic structural diagram of a network device according to another embodiment of this disclosure. As shown in FIG. 10, the network device 1000 includes a processor 1001, a transceiver 1002, a memory 1003, and a bus interface.

In this embodiment of this disclosure, the network device 1000 further includes: a computer program stored in the memory 1003 and capable of running on the processor 1001. When the computer program is executed by the processor 1001, the processes of the foregoing method shown in FIG. 2 are implemented, with the same technical effects achieved. To avoid repetition, details are not described herein again.

In FIG. 10, a bus architecture may include any quantity of interconnected buses and bridges, and specifically connects together circuits that are of one or more processors represented by the processor 1001 and of a memory represented by the memory 1003. The bus architecture may further interconnect various other circuits such as a peripheral device, a voltage regulator, and a power management circuit. These are all well known in the art, and therefore are not further described in this specification. The bus interface provides an interface. The transceiver 1002 may be a plurality of components, including a transmitter and a receiver, and provides units for communicating with a variety of other apparatuses on a transmission medium.

The processor 1001 is responsible for management of the bus architecture and general processing, and the memory 1003 is capable of storing data that is used by the processor 1001 during operation.

An embodiment of this disclosure further provides a computer-readable storage medium. The computer-readable storage medium stores a computer program, and when the computer program is executed by a processor, the processes of the method embodiments shown in FIG. 1 to FIG. 4 are implemented, with the same technical effect achieved. To avoid repetition, details are not described herein again. The computer-readable storage medium is, for example, a read-only memory (ROM for short), a random access memory (RAM for short), a magnetic disk, or an optical disc.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for data transmission, performed by a terminal device and comprising:
   in a case that a first data packet has been generated based on a first uplink grant and uplink transmission corresponding to the first uplink grant is given up, determining, according to a selection rule, a second uplink grant for transmitting the first data packet;
   wherein the first uplink grant and the second uplink grant correspond to a same hybrid automatic repeat request (HARQ) process identifier;
   wherein the selection rule comprises one of the following rules:
   determining an uplink grant conflicting with the first uplink grant as the second uplink grant; and
   determining a target uplink grant located after the first uplink grant in time domain as the second uplink grant, wherein the first uplink grant is a configured uplink grant, and the target uplink grant is a configured uplink grant.

2. The method according to claim 1, wherein the target uplink grant corresponds to first configuration information for configuring the first uplink grant, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device; or,
   wherein the target uplink grant corresponds to first configuration information for configuring the first uplink grant, and a time interval between the target uplink grant and the first uplink grant is less than a time interval between the first uplink grant and another uplink grant in uplink grants corresponding to the first configuration information; or,
   wherein the target uplink grant corresponds to second configuration information, a time interval between the target uplink grant and the first uplink grant is less than a time interval between the first uplink grant and another uplink grant in uplink grants corresponding to the second configuration information, wherein the second configuration information comprises at least one piece of uplink grant configuration information; or,
   wherein the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device, wherein the second configuration information comprises at least one piece of uplink grant configuration information; or,
   wherein the target uplink grant is an uplink grant with a smallest time interval from the first uplink grant in all uplink grants of the terminal device.

3. The method according to claim 1, wherein the method further comprises:
   after a second data packet is generated based on the second uplink grant, clearing the first data packet, or continuing to store the first data packet, wherein the second data packet comprises data of the first data packet.

4. The method according to claim 1, wherein the method further comprises:
   responsive to determining that retransmission indication information has not been received before the first data packet is transmitted by using the second uplink grant, transmitting the first data packet by using the second uplink grant; wherein
   the retransmission indication information indicates that the terminal device transmits the first data packet by using a third uplink grant.

5. The method according to claim 4, wherein the method further comprises:
   responsive to determining that the retransmission indication information has been received before the first data packet is transmitted by using the second uplink grant, transmitting the first data packet in a target manner; wherein
   the target manner comprises one of the following manners:
   giving up transmitting the first data packet by using the second uplink grant, and transmitting the first data packet by using the third uplink grant;

giving up transmitting the first data packet by using the third uplink grant, and transmitting the first data packet by using the second uplink grant;

transmitting the first data packet by using one uplink grant, with a smaller time interval from the first uplink grant, in the second uplink grant and the third uplink grant;

transmitting the first data packet by using one uplink grant with higher transmission reliability in the second uplink grant and the third uplink grant;

transmitting the first data packet by using one uplink grant with a larger Transport Block Size (TBS) in the second uplink grant and the third uplink grant;

transmitting the first data packet by using one uplink grant, occupying fewer transmission resources, in the second uplink grant and the third uplink grant; and transmitting the first data packet by using the second uplink grant and the third uplink grant.

6. A method for data reception, performed by a network device and comprising:

responsive to determining that retransmission indication information has not been transmitted to a terminal device before a first data packet is received by using a second uplink grant, receiving the first data packet by using the second uplink grant; wherein the retransmission indication information indicates that the terminal device transmits the first data packet by using a third uplink grant, and the second uplink grant is determined according to a selection rule in a case that the terminal device has generated the first data packet based on a first uplink grant and given up uplink transmission corresponding to the first uplink grant;

wherein the first uplink grant and the second uplink grant correspond to a same hybrid automatic repeat request (HARQ) process identifier;

wherein the selection rule comprises one of the following rules:

determining an uplink grant conflicting with the first uplink grant as the second uplink grant; and determining a target uplink grant located after the first uplink grant in time domain as the second uplink grant, wherein the first uplink grant is a configured uplink grant, and the target uplink grant is a configured uplink grant.

7. The method according to claim 6, wherein the target uplink grant corresponds to first configuration information for configuring the first uplink grant, and a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device; or, wherein the target uplink grant corresponds to first configuration information for configuring the first uplink grant, and a time interval between the target uplink grant and the first uplink grant is less than a time interval between the first uplink grant and another uplink grant in uplink grants corresponding to the first configuration information; or, wherein the target uplink grant corresponds to second configuration information, a time interval between the target uplink grant and the first uplink grant is less than a time interval between the first uplink grant and another uplink grant in uplink grants corresponding to the second configuration information, wherein the second configuration information comprises at least one piece of uplink grant configuration information; or, wherein the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device, wherein the second configuration information comprises at least one piece of uplink grant configuration information; or, wherein the target uplink grant is an uplink grant with a smallest time interval from the first uplink grant in all uplink grants of the terminal device.

8. The method according to claim 6, wherein a transport block size (TBS) for the second uplink grant is greater than or equal to a TBS for the first uplink grant.

9. The method according to claim 6, wherein the method further comprises:

responsive to determining that the retransmission indication information has been transmitted to the terminal device before the first data packet is received by using the second uplink grant, receiving the first data packet in a target manner; wherein the target manner comprises one of the following manners:

giving up receiving the first data packet by using the second uplink grant, and receiving the first data packet by using the third uplink grant;

giving up receiving the first data packet by using the third uplink grant, and receiving the first data packet by using the second uplink grant;

receiving the first data packet by using one uplink grant, with a smaller time interval from the first uplink grant, in the second uplink grant and the third uplink grant;

receiving the first data packet by using one uplink grant with higher transmission reliability in the second uplink grant and the third uplink grant;

receiving the first data packet by using one uplink grant with a larger TBS in the second uplink grant and the third uplink grant;

receiving the first data packet by using one uplink grant, occupying fewer transmission resources, in the second uplink grant and the third uplink grant; and receiving the first data packet by using the second uplink grant and the third uplink grant.

10. A terminal device, comprising a memory, a processor, and a computer program stored in the memory and capable of running on the processor, wherein when the computer program is executed by the processor, the steps of the method for data transmission are implemented, wherein the method comprises:

in a case that a first data packet has been generated based on a first uplink grant and uplink transmission corresponding to the first uplink grant is given up, determining, according to a selection rule, a second uplink grant for transmitting the first data packet;

wherein the first uplink grant and the second uplink grant correspond to a same hybrid automatic repeat request (HARQ) process identifier;

wherein the selection rule comprises one of the following rules:
  determining an uplink grant conflicting with the first uplink grant as the second uplink grant; and
  determining a target uplink grant located after the first uplink grant in time domain as the second uplink grant,
  wherein the first uplink grant is a configured uplink grant, and the target uplink grant is a configured uplink grant.

11. The terminal according to claim 10, wherein the target uplink grant corresponds to first configuration information for configuring the first uplink grant, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the first configuration information is less than the target duration, and the target duration is minimum duration required for reconstructing a data packet by the terminal device; or,
  wherein the target uplink grant corresponds to first configuration information for configuring the first uplink grant, and a time interval between the target uplink grant and the first uplink grant is less than a time interval between the first uplink grant and another uplink grant in uplink grants corresponding to the first configuration information; or,
  wherein the target uplink grant corresponds to second configuration information, a time interval between the target uplink grant and the first uplink grant is less than a time interval between the first uplink grant and another uplink grant in uplink grants corresponding to the second configuration information, wherein the second configuration information comprises at least one piece of uplink grant configuration information; or,
  wherein the target uplink grant corresponds to second configuration information, a time interval between the target uplink grant and the first uplink grant or a time point of determining use of the target uplink grant is greater than or equal to target duration, a time interval between the first uplink grant and another uplink grant, located before the target uplink grant in time domain, in uplink grants corresponding to the second configuration information is less than the target duration, and the target duration is minimum duration required for reconstructing a data packet by the terminal device, wherein the second configuration information comprises at least one piece of uplink grant configuration information.

12. The terminal according to claim 10, wherein the target uplink grant is an uplink grant with a smallest time interval from the first uplink grant in all uplink grants of the terminal device.

13. The terminal according to claim 10, wherein the method further comprises:
  responsive to determining that retransmission indication information has not been received before the first data packet is transmitted by using the second uplink grant, transmitting the first data packet by using the second uplink grant; wherein
  the retransmission indication information indicates that the terminal device transmits the first data packet by using a third uplink grant.

14. The terminal according to claim 13, wherein the method further comprises:
  responsive to determining that the retransmission indication information has been received before the first data packet is transmitted by using the second uplink grant, transmitting the first data packet in a target manner; wherein
  the target manner comprises one of the following manners:
  giving up transmitting the first data packet by using the second uplink grant, and transmitting the first data packet by using the third uplink grant;
  giving up transmitting the first data packet by using the third uplink grant, and transmitting the first data packet by using the second uplink grant;
  transmitting the first data packet by using one uplink grant, with a smaller time interval from the first uplink grant, in the second uplink grant and the third uplink grant;
  transmitting the first data packet by using one uplink grant with higher transmission reliability in the second uplink grant and the third uplink grant;
  transmitting the first data packet by using one uplink grant with a larger TBS in the second uplink grant and the third uplink grant;
  transmitting the first data packet by using one uplink grant, occupying fewer transmission resources, in the second uplink grant and the third uplink grant; and
  transmitting the first data packet by using the second uplink grant and the third uplink grant.

* * * * *